G. B. Garlinghouse,
Road Scraper.

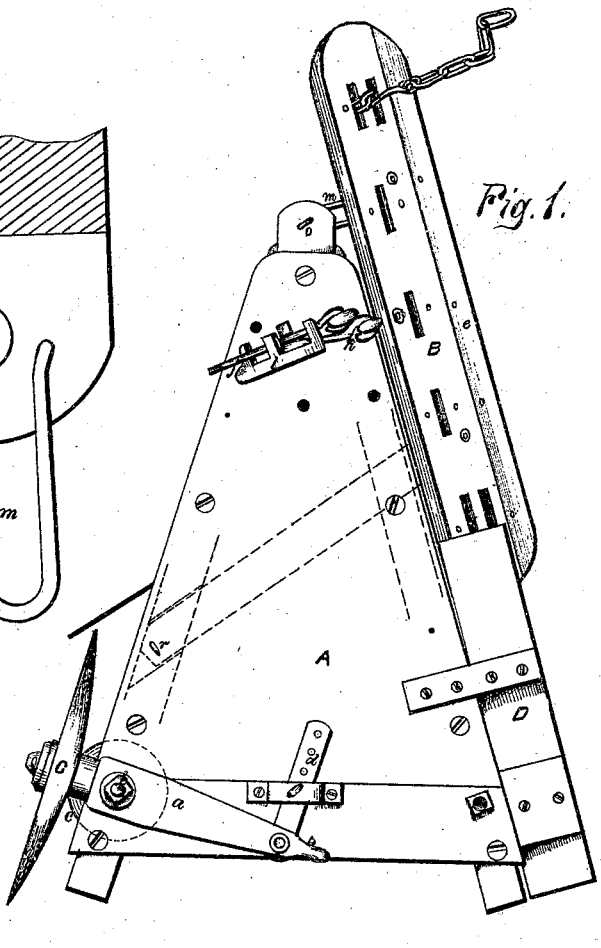

No. 111,338.    Patented Jan. 31, 1871.

Witnesses.
Henry Connet Sen
William C. Linebach

Inventor.
George B. Garlinghouse
by his Attys.
A. M. Connett & Bro.

United States Patent Office.

GEORGE B. GARLINGHOUSE, OF NORTH MADISON, INDIANA.

Letters Patent No. 111,338, dated January 31, 1871

IMPROVEMENT IN ROAD-SCRAPERS.

The Schedule referred to in these Letters Patent and making part of the same.

*To all whom it may concern:*

Figure 5:
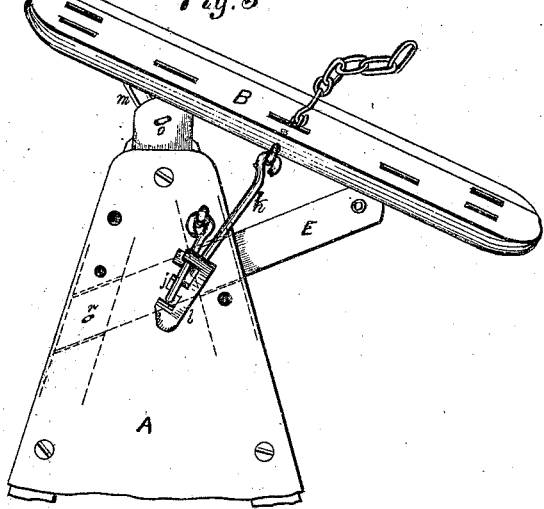
Figure 6:
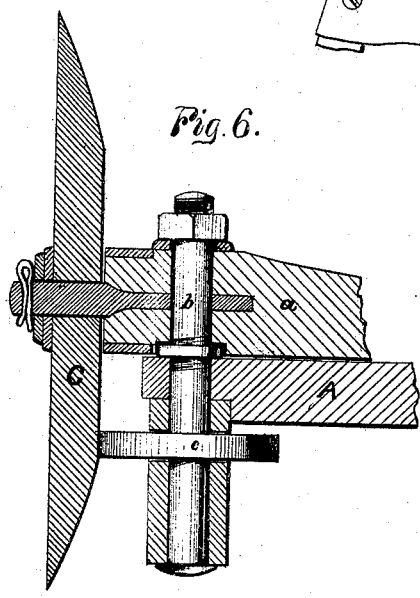
Figure 8:
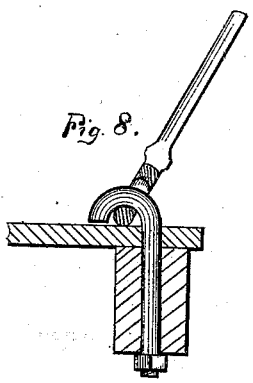
Figure 7:
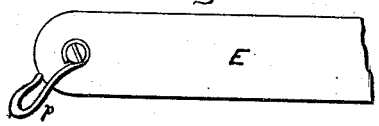

Be it known that I, GEORGE B. GARLINGHOUSE, of North Madison, in the county of Jefferson and State of Indiana, have invented a new and useful Improvement in Road-Scrapers; and I do hereby declare the following to be a full and exact description of the same, reference being had to the accompanying drawing making part of this specification, Figure 1 being a plan of the same;

Figure 2 being an enlarged view of the hook for attaching the scraper to the front end of the frame;

Figure 3 being a rear view of the scraper-board;

Figure 4, a side view of the machine;

Figure 5, a plan, showing the scraper in another position;

Figure 6 being an enlarged section of the push-wheel device;

Figure 7, a view, showing the manner of securing the hook to the end of the diagonal bar;

Figure 8, an enlarged view, showing the form of hook used for securing the lever to the main frame.

Like letters of reference indicate corresponding parts in all the figures.

This invention has for its object the accomplishment of as much or more work than the cumbrous and heavy scraper in ordinary use with an implement that is light and convenient, easily and rapidly operated, and capable of reversion, so as to suit the ground to be operated upon.

My invention contains several important features, one of which consists in providing the rear outside corner of the main frame with a push-wheel, the peculiar nature and construction of which will be described further on.

Another important feature consists in the peculiar construction and arrangement of the scraping-board.

Another important feature consists in providing the inner rear corner of the main frame with an inclined lifter, which serves as a guard to protect the main frame from an accumulation of dirt, and, by overriding the ridge of earth left by the scraper-board, keeps the corner of the frame from cutting in too deeply, and assists in the work of leveling and grading.

Another important feature consists in the reversibility of the different parts, so that the scraper may work right or left-handed at pleasure.

Let A, fig. 1, represent the frame of a road-scraper, triangular in form, and

B the scraper-board.

C is the push-wheel, shown enlarged in fig. 6, and

D the inclined lifter.

These, taken collectively, and arranged substantially as shown in fig. 1, with their necessary attachments, form the scraper complete and ready for use.

The push-wheel C may be made of any suitable material, but should have a sharp edge, so that it may sink into the ground sufficiently to get a firm hold.

This wheel turns on a journal projecting from an axle, *a*, which rotates horizontally on a vertical bolt, *b*.

On the lower end of this bolt is a horizontal wheel, *c*, working in a mortise through the side frame of the scraper, and of sufficient diameter to bear against the inside of the push-wheel C. As the axle of this latter wheel turns horizontally on the same vertical bolt as the wheel *c*, it will be seen that, at whatever angle the push-wheel is set, its inner surface will always remain in contact with the periphery of the wheel *c*, which serves to sustain the push-wheel and prevent too great a strain being thrown on the axle of the latter.

To enable the operator to set the push-wheel at any desired angle, the end of the axle *a* is provided with a strip pierced with holes for the reception of a pin; by this arrangement, as clearly shown in fig. 1, this end may be accomplished, and the wheel held firmly in the desired position.

The scraper-board B has a slight lateral curvature, is provided with a metallic strip, *e*, at its lower edge, and is rounded at the ends.

It has also a series of mortises, *f f*, with bars across them, said bars being secured to the back of the scraper-board, as seen in fig. 3; these are for the purpose of attaching the draft-chain F at any desired point in the length of the board.

In fig. 3 are also shown the eye-bolts *h h*, by which the board B is secured to the frame A; and also the ring *i*, to which is attached a lever, *j*.

This lever operates, through the medium of a hook, *k*, and ratchet, *l*, to regulate the angle of the scraper-board B with the ground to hold it firmly in its place, and permit it, when the lever is freed from the ratchet, to dump itself.

In fig. 2 is shown the peculiar form of hook used to connect the scraper-board with the front end of the frame A, *m* representing the hook, *n* the slot in the end of the frame, and *o* the pin for securing the hook in place, it being first engaged with one of the eye-bolts *h* in the scraper. (See fig. 3.)

The rear end of the scraper is secured, by means of the other eye-bolt *h*, to a bar, E, through the medium of a hook, *p*, attached to said bar, as seen in fig. 7.

This bar extends, through mortises in the side frames, diagonally across the frame, as indicated by dotted lines in fig. 1, and is secured by a pin, *r*.

The incline-board D is simply a smooth board secured to the main frame by battens and screws, substantially in the manner indicated in figs. 1 and 4.

When it is desired that the scraper B be set in the position shown in fig. 5, the bar E is inserted in two other mortises through the side frame, forward of those last mentioned, and also indicated by dotted lines in fig. 5. In this position of the scraper-board it is considered preferable to attach the draft-chain F in the central mortise. A change is also necessary in the position of the ratchet $l$, and longer hook $k$ will have to be provided.

As all the bolt-holes, pin-holes, and mortises are duplicated, and the main frame precisely alike on both sides, it will be unnecessary to describe in detail every operation necessary to reverse the scraper, so as to scrape on the left instead of the right, the latter arrangement being the one shown in the drawing; but I will state that, in this event, the push-wheel device and the incline-board D exchange places, and the scraper-board B changes ends, the bar E taking the place of the hook $m$, and *vice versa*. Some minor changes will also be necessary, but these are too obvious to need description.

It may be necessary to state that, in its operation, the scraper works, usually, longitudinally with the axis of the roadway to be thrown up, the scraper-board being on the inside both in going and returning.

As the scraper-board is usually set at one of the angles shown in figs. 1 and 5, the breadth of the ground graded at once passing over is regulated and governed by the angle at which the push-wheel is set, or, in other words, the angle it makes with the line of draft. This also governs the amount of draft or power required; for, if the push-wheel is inclined inward considerably, its constant tendency is to push the rear end of the scraper inward, thus, by forcing the scraper-board into a position approaching a right angle with the roadway, greatly increasing the breadth graded. If the push-wheel is set to coincide with the line of draft, the amount of draft and the breadth of ground graded will be a minimum.

A fender or guard for the push-wheel is shown, but, as it is not new and very simple, no description of it has been given.

I do not claim the triangular form of the scraper, for it is old; but

What I do claim is—

1. The device, consisting of the push-wheel C, horizontal wheel $c$, axle $a$, and bolt $b$, or its equivalent, arranged to operate substantially in the manner shown, and for the purposes set forth.

2. In a road-scraper, the incline-board D, when constructed and attached as shown, and arranged to operate substantially in the manner and for the purposes set forth.

3. A road-scraper, so constructed that the scraper-board B may be reversible and the push-wheel C and the incline-board D interchangeable, and the whole machine be thus made to operate either right or left-handed, when the said parts are constructed and arranged to operate in the manner shown, and for the purpose set forth.

Witness my hand this 25th day of June, 1870.

GEORGE B. GARLINGHOUSE.

Witnesses:
 HENRY CONNETT, Jr.,
 A. M. CONNETT.